United States Patent [19]

Ikedo et al.

[11] Patent Number: 5,587,625

[45] Date of Patent: Dec. 24, 1996

[54] GAS DISCHARGE TUBE

[75] Inventors: Tomoyuki Ikedo; Yoshinobu Ito; Ryotaro Matui, all of Hamamatsu, Japan

[73] Assignee: Hamamatsu Photonics K.K., Hamamatsu, Japan

[21] Appl. No.: 502,010

[22] Filed: Jul. 13, 1995

[30] Foreign Application Priority Data

Aug. 31, 1994 [JP] Japan .................................. 6-207712

[51] Int. Cl.$^6$ ...................................................... H01J 17/02
[52] U.S. Cl. ............................................. 313/613; 313/239
[58] Field of Search ....................................... 313/613, 616, 313/618, 619, 326, 238, 239, 589

[56] References Cited

U.S. PATENT DOCUMENTS 5,552,669  9/1996  Ikedo ........................................ 313/613

FOREIGN PATENT DOCUMENTS 60-29400  2/1985  Japan .
4255662   9/1992  Japan .

*Primary Examiner*—Sandra L. O'Shea
*Assistant Examiner*—Vip Patel
*Attorney, Agent, or Firm*—Cushman Darby & Cushman, IP Group of Pillsbury Madison & Sutro LLP

[57] ABSTRACT

The present invention is to provide a gas discharge tube having a long service life and capable of an operational stability during long-time continuous light emission. The gas discharge tube includes an envelop for accommodating a hot cathode for emitting thermoelectrons, an anode plate for receiving the thermoelectrons, a focusing electrode having a focusing opening for converging a path of the thermoelectrons, and a discharge shielding member of an insulator having a through hole coaxially arranged with an inner diameter larger than the focusing opening, and a support member having projections efficiently gripping the anode plate with the discharge shielding member so as to increase the heat radiation efficiency of the anode plate.

22 Claims, 11 Drawing Sheets

GAS DISCHARGE TUBE

BACKGROUND OF THE INVENTION

1. Field of the invention

The present invention relates to a gas discharge tube used as an ultraviolet light source for a spectrophotometer, liquid chromatography, or the like.

2. Related background art

A gas discharge tube is a discharge light source using positive column light emission by arc discharge of a gas sealed in a tube. As a typical gas discharge tube, a deuterium discharge tube in which ultraviolet light is emitted by discharge of sealed deuterium is known. This deuterium discharge tube is mainly used as an ultraviolet continuous spectrum source for a spectrophotometer or the like. Note that such a deuterium discharge tube is described in, e.g., Japanese Patent Laid-Open No. 4-255662.

SUMMARY OF THE INVENTION

In this discharge tube, since very small variations of, e.g., 0.01% or 0.001% in output is undesirable during long-time continuous lighting, strict characteristics are requested in many cases.

It is one of objects of the present invention to provide a gas discharge tube having a longer service life than the conventional gas discharge tube and capable of improving the operational stability during long-time continuous light emission.

In order to achieve the object, as shown in FIG. 1, a gas discharge tube 10 relating to the present invention comprises: a glass envelope 11 for sealing a gas such as deuterium therein; lead pins 13 to 16, which are respectively coated by insulating members 130 to 160, introduced into an inner space of the envelope 11 from exterior of the envelope ! 1; and a light-emitting section 20 positioned at distal ends of the lead pins 13–16 and supported by the lead pins 13–16 while spaced from an inner side wall of the envelope 11. The light-emitting section 20, as shown in FIG. 2, further comprises: a hot cathode 25 for emitting thermoelectrons; an anode plate 24 made of a high melting point metal such as molybdenum, for receiving the thermoelectrons emitted from the hot cathode 25; a focusing electrode 26 having a focusing opening 262 for converging and passing through the thermoelectrons; a discharge shielding member 21 of an insulator, for example a ceramic, positioned between the focusing electrode 26 and the anode plate 24 in order to define a distance between the focusing electrode 26 and the anode plate 24; and a support member 22 of an insulator, for example a ceramic, located on an opposite side to the discharge shielding member 21 through the anode plate 24 in order to grip a part of the anode plate 24 with the discharge shielding member 24. Furthermore, the gas discharge tube 10 comprises: a cathode slit electrode 27 for discharge shielding, positioned and mounted on the front surface 21A of the discharge shielding member 21, the cathode slit electrode 27 having a slit 270 for passing through the thermoelectrons emitted from the hot cathode 25; and a front electrode 23 for shielding arc discharge, positioned and mounted on the front surface 21A of the discharge shielding member 21 to accommodate the hot cathode 25 and the cathode slit electrode 27 in a space defined by the front electrode 23 and the focusing electrode 26, the front electrode 23 having a window 230 located at a position which faces to the focusing opening 262 of the focusing electrode 26, for outputting ultraviolet light (U.V) caused by arc discharge.

The discharge shielding member 21, as shown in FIG. 3, has a front surface 21A and a rear surface 21B which is opposite to the front surface 21A and which is connected to the front surface 21A by a through hole 210. In particular, the discharge shielding member 21 has a recessed portion 211 for accommodating the anode plate 24 (a metal plate), and is in contact with parts C2 (see FIG. 4) of the anode plate 24 at parts C1 of the rear surface 21B of said discharge shielding member 21. Therefore, the anode plate 24 covers an opening of the through hole 210 at the rear surface side of the discharge shielding member 21. The focusing electrode 26 is also supported by the discharge shielding member 21 and in contact with the front surface 21A of the discharge shielding member 21, thereby a distance between the focusing electrode 26 and the anode plate 24 is kept at a constant distance.

Next, the support member, as shown in FIG. 4, has projections 225 for respectively pushing parts C4 (see FIG. 3) of the anode plate 24 onto the parts C1 of the rear surface 21B of the discharge shielding member 21, and further has a depression 224 for at a front surface 22B which faces to the anode plate 24, for providing a heat dissipation space for the anode plate 24. Therefore, the parts C1 of the discharge shielding member 21 are brought into contact with the parts C2 of the anode plate 24, and the parts C3 of the support member 22 are brought into contact with the parts C4 of the anode plate 24. Particularly, a top surface of each projection 225 contains the part C3 contacting the associated part C4 of the anode plate 24, but other part of the top surface of each projection 225 faces the rear surface 21B of the discharge shielding member 21 without through the anode plate 24. As a result, the anode plate 24 is gripped at a plurality of parts thereof, and the present invention obtains a structure that is effective to increase the heat radiation efficiency of the anode plate. In other words, this structure decreases area contacting insulator having a lower heat conductivity.

The recessed portion 211 of the discharge shielding member 21, as shown in FIG.8, has a depth W21 matching a sum of a height W225 of the projections of the support member 22 and a thickness W24 of the anode plate 24, thereby an edge of the front surface 22B of the support member 22 is in directly contact with the rear surface 21B of the discharge shielding member 21.

The anode 24 is a metal plate mounted on and supported by a distal end of a lead pin 14 penetrating the glass envelope 11, the lead pin 14 being covered by the insulating member 140.

In the gas discharge tube 10 of the present invention, when arc discharge occurs between the focusing electrode 26 and the anode plate 24, the anode plate 24 generates heat upon reception of thermoelectrons, and the focusing electrode 26 also generates heat upon bombardment of cations. Since the anode plate 24 and the focusing electrode 26 are arranged so as to be in contact with the front and the rear surfaces 21A and 21B of the discharge shielding member 21, the insulation distance between these two electrodes 24 and 26 will be maintained by the discharge shielding member 21. Because, if the anode plate 24 and the focusing electrode 26 of the present invention are deformed at a high temperature for heating, a change in distance between the hot cathode 25 and the anode plate 24, which is set to a desired distance in advance, results in undesirable deformation of the paths of the thermoelectrons between the focusing electrode 26 and the anode plate 24.

In addition, at least two portions of the opening edge portion of the through hole 210 at the rear surface side are joined with the circumference of the anode plate 24 while the remaining portion of the opening edge portion is matched with the circumference of the anode plate 24. For this reason, the surface of the anode plate 24 is exposed at maximum through the through hole 210 of the discharge shielding member 21. Therefore, heat dissipation from the anode plate 24 and the focusing electrode 26 is promoted. Although the material constituting the discharge shielding member 21 and having electrical insulating properties generally has a low thermal conductivity, the temperature in a space near the anode plate 24 and the focusing electrode 26 can be kept relatively low.

When the anode plate 24 is held while sandwiched between the discharge shielding member 21 and the support member 22, a plurality of protrusions (projections 225) of the support member 22 are used to expose the surface of the anode plate 24 at maximum. Further, the heat dissipation space for the anode plate 24 is ensured by providing the depression 224 of the support member 22. For this reason, heat dissipation from the anode plate and the focusing electrode is promoted.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

The arrangement and function of a gas discharge tube according to the first embodiment of the present invention will be described below in detail with reference to FIGS. 1 to 13. Note that the gas discharge tube of this embodiment is a side-on type deuterium discharge tube which extracts light (U.V) from the side portion of the tube.

Figure 1:
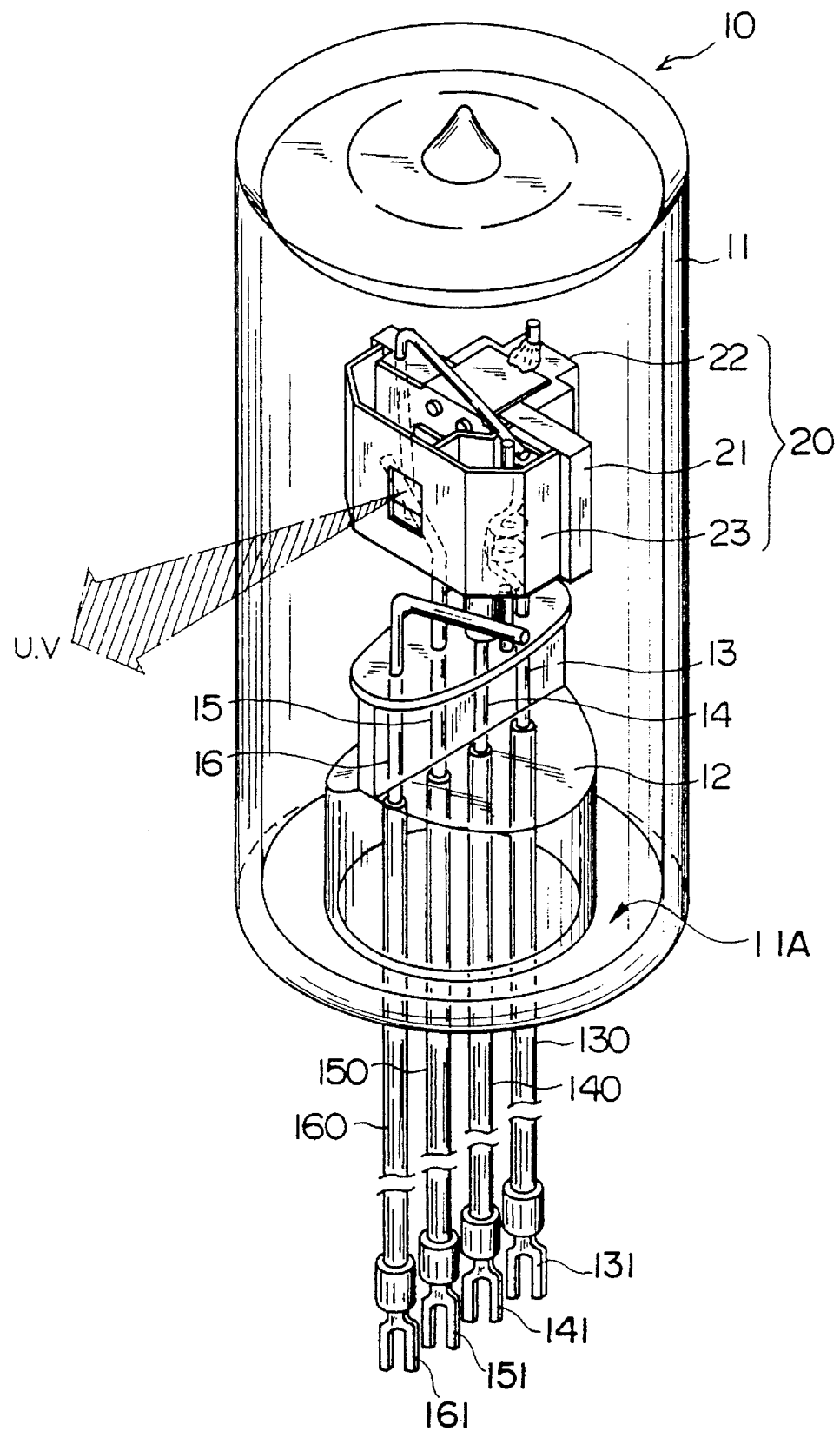
FIG. 1 is a perspective view showing a gas discharge tube according to the first embodiment of the present invention.

In a gas discharge tube 10 shown in FIG. 1, a light-emitting section 20 is accommodated in a glass envelope 11 while being supported by lead pins 13 to 16. Deuterium gas in the glass envelope 11 is sealed at about several Torr. The envelop 11 with its head portion sealed has a cylindrical shape, and the bottom portion of the envelope 11 is hermetically sealed by a glass stem 12. The envelop 11 is formed of ultraviolet light transmitting glass or quartz glass having a high permeability to ultraviolet light.

The four lead pins 13 to 16 which are in parallel aligned in line extend through the glass stem 12 from the bottom portion of the light-emitting section 20, and are covered by insulating members 130, 140, 150, and 160, respectively. Terminals 131, 141, 151, and 161 will be connected to terminals of an external power supply. The light-emitting section 20 has a shielding box structure in which a ceramic support member 22 and a metal front electrode 23 are bonded each other while a ceramic discharge shielding member (spacer) 21 is sandwiched therebetween. The anode plate 24 is sandwiched by the discharge shielding member 21 and the support member 22, and is accommodated in a space defined by these members 21 and 22.

The embodiments of this invention relate to for example U.S. patent application No. 08/305,972, Japanese Patent Laid-Open No. 4-255662, and the like. Particularly, a basic structure of the gas discharge tube and materials of members such as anode, etc. are described in these references.

For example, the discharge shielding member 21 and the support member 22 are made of ceramic as insulator, and the anode plate 24 is made of molybdenum as high melting point metal. In this specification, the high melting metal means material group having a higher melting point than sillicon (1414° C).

The structure of the light-emitting section 20 will be described below in detail with reference to FIGS. 2 to 8.

Figure 2:
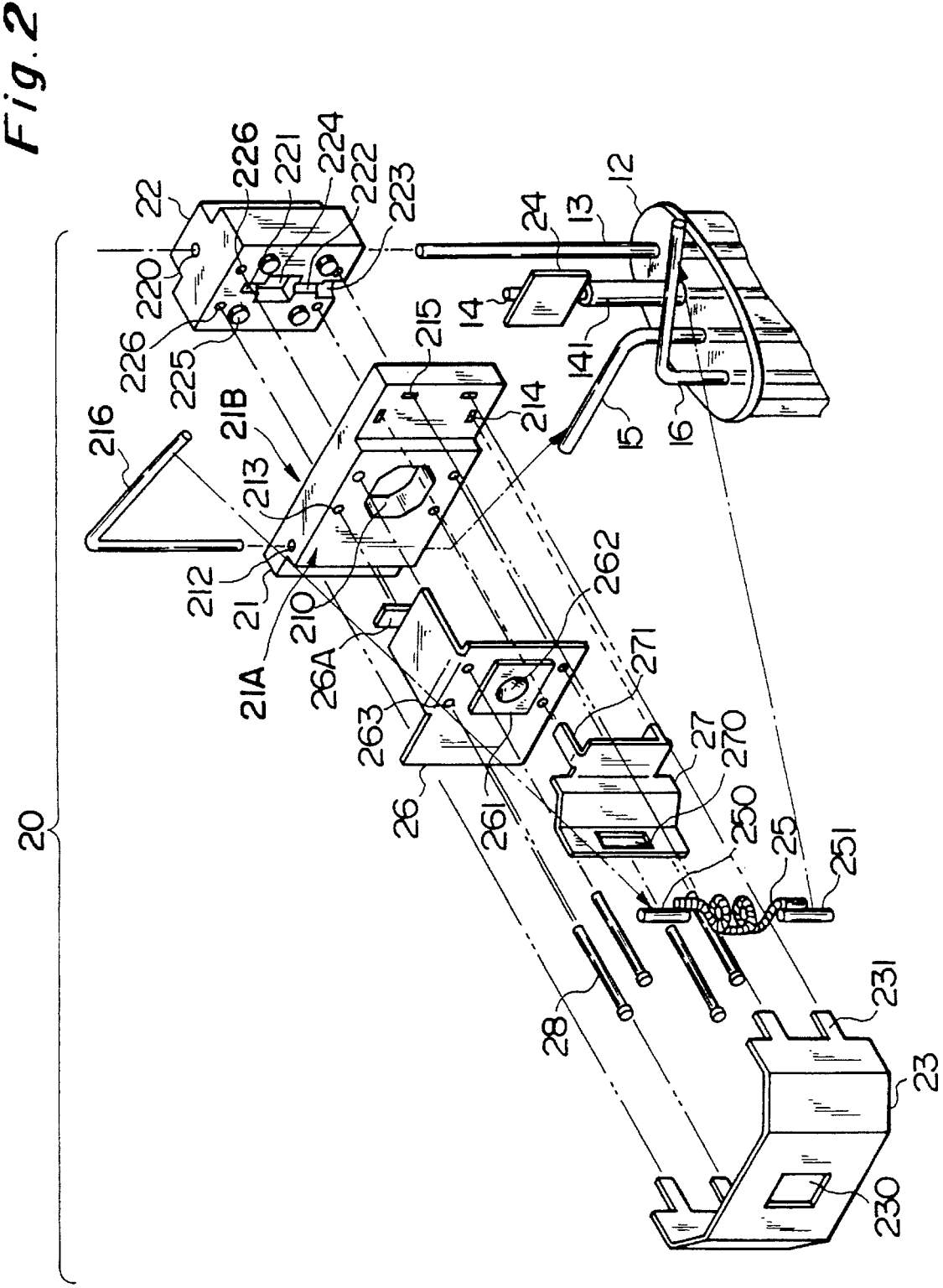
FIG. 2 is an exploded perspective view of a light-emitting portion of the gas discharge tube 20 in FIG. 1.
Figure 3:
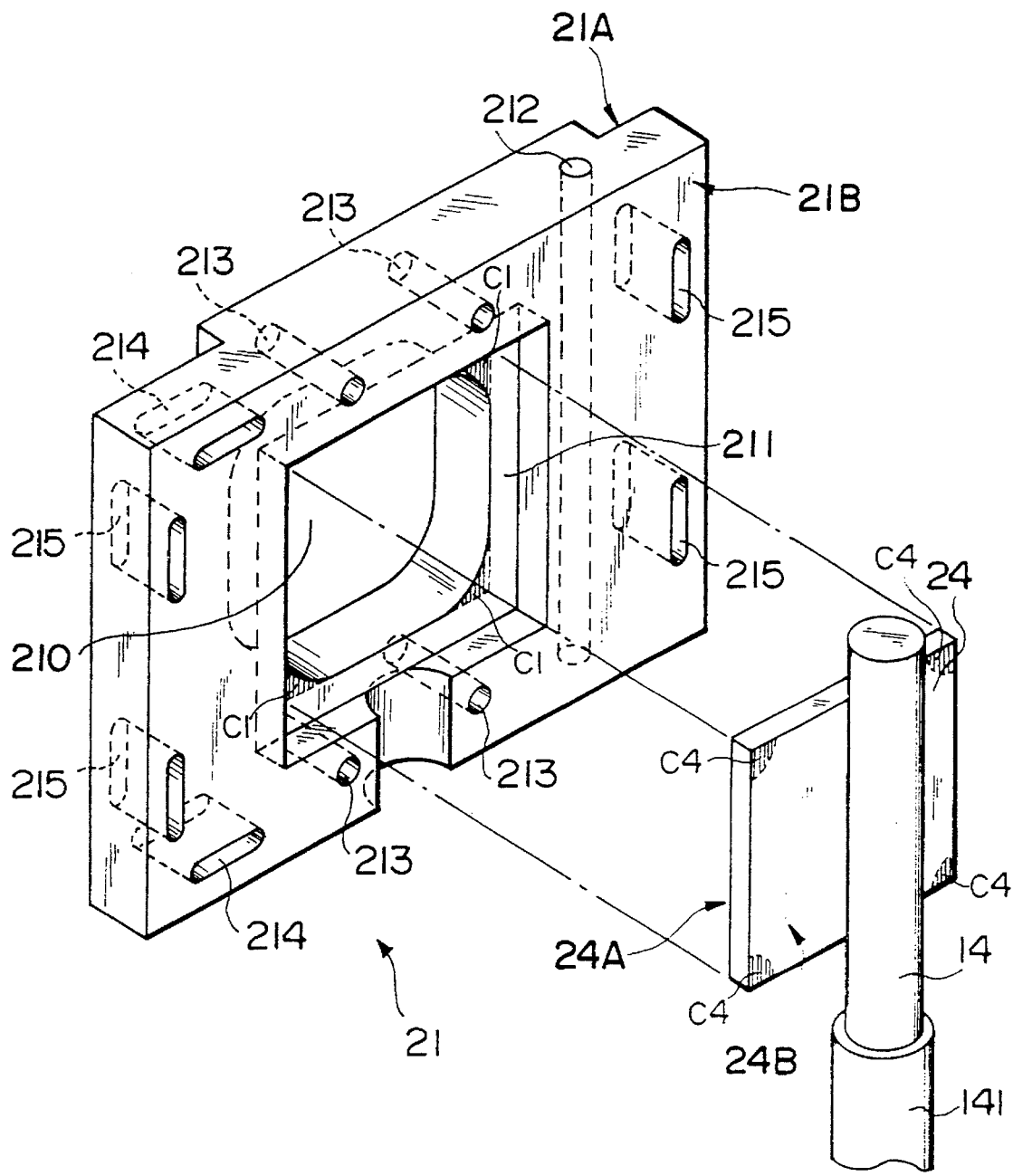
FIG. 3 is a perspective view showing a discharge shielding member and an anode plate in the light-emitting portion in FIG. 2 before assembly.

As shown in FIGS. 2 and 3, the flat plate-like discharge shielding member 21 has a swell section thinner and wider than the support member 22. The discharge shielding member 21 has a through hole 210, a recessed portion 211, a vertical through hole 212, four horizontal through holes 213, two horizontal through holes 214 and four horizontal through holes 215. The through hole 210 extends through the discharge shielding member 21 almost at its central portion to oppose the anode plate 24. The recessed portion 211 is recessed from the rear surface 21B of the discharge shielding member 21. The recessed portion 211 also includes an opening edge portion located on the rear surface side of the through hole 210. The vertical through hole 212 extends in the vertical direction with respect to the bottom surface 11A of the envelope 11, and passes through the discharge shielding member 21. The four horizontal through holes 213 respectively extend in the horizontal direction with respect to the bottom surface 11A of the envelope 11. The two horizontal through holes 214 of the discharge shielding member 21 are formed at positions to insert lock pawls 271 of a cathode slit electrode 27 (to be described later). The four horizontal through holes 215 are formed at positions to insert lock pawls 231 of the front electrode 23 (to be described later).

One side of a substantially L-shaped electrode rod 216 is inserted in the vertical through hole 212, and the lower end of the electrode rod 216 is exposed from the discharge shielding member 21 so as to be welded to the distal end of the lead pin 15. Therefore, the discharge shielding member 21 will be held by the glass stem 12 through the electrode rod 216. Electrode rods 250 and 251 are welded to the two ends of a hot cathode (filament) 25. The electrode rod 250 is welded to the distal end of the electrode rod 216, and the electrode rod 251 is welded to the distal end of the lead pin 16, with this structure, the hot cathode 25 will be held by the stem 12.

Figure 4:
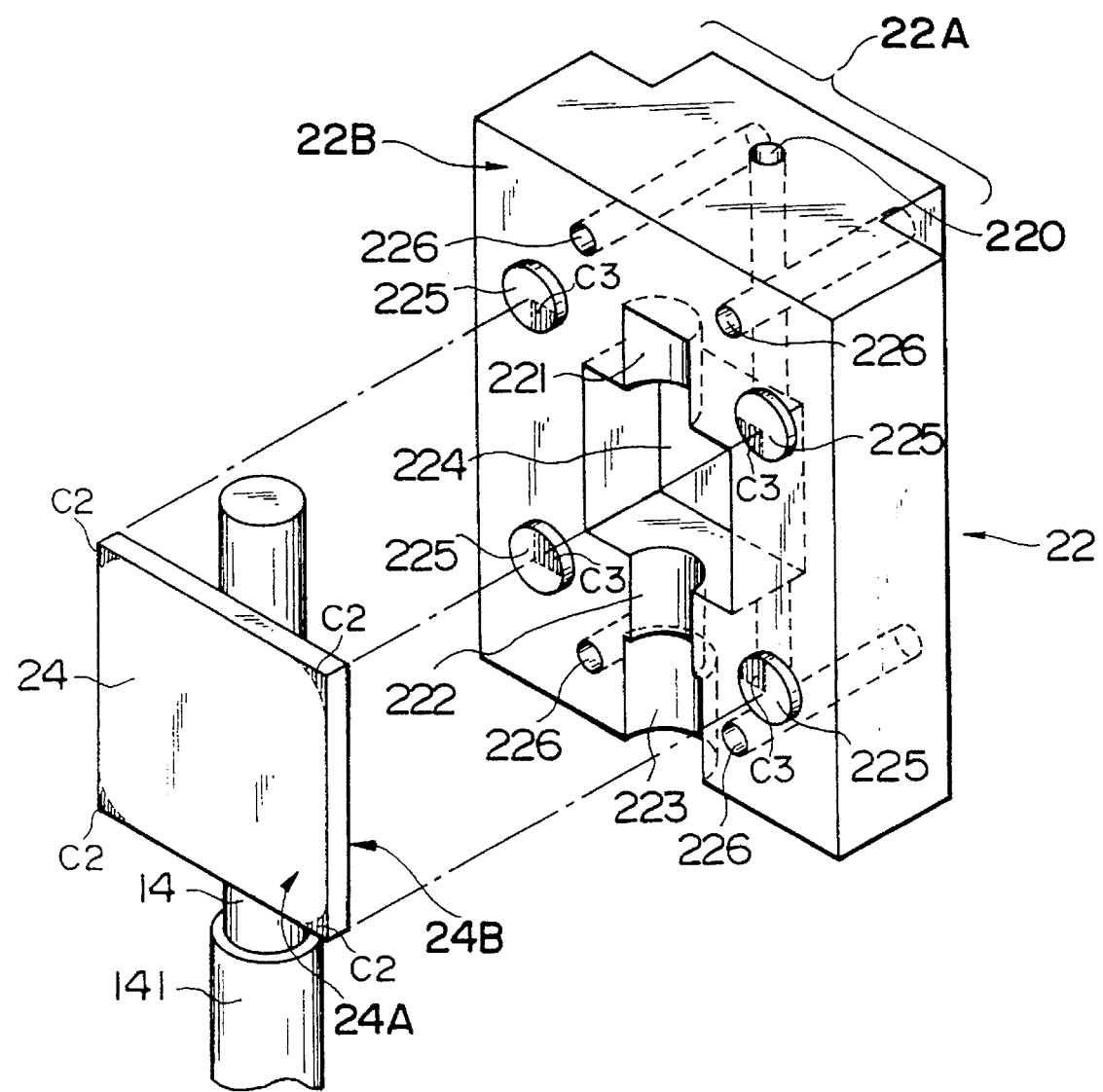
FIG. 4 is a perspective view showing a support member and the anode plate in the light-emitting portion in FIG. 2 before assembly.

As shown in FIGS. 2 and 4, the support member 22 is a prism having the section 22A. A vertical through hole 220, concave grooves 221 to 223, a depression 224, four protrusions (projections 225), and four horizontal through holes 226 are formed in the support member 22. The vertical through hole 220 vertically extends in the vertical direction with respect to the bottom surface 11A of the envelope 11, and passes through the section 22A of the support member 22. The concave grooves 221 to 223 and the depression 224 are recessed on the front surface 22B of the support member 22 and sequentially extend toward the bottom surface 11A of the envelop 11, thereby appropriately accommodating the lead pin 14 and an insulating member 141. The four projections 225 are formed close to the opening edge portions of the concave grooves 221 and 222 and project from the front surface 22B of the support member 22 so as to oppose the corners of an anode plate 24. The four horizontal through holes 226 extend in the horizontal direction to oppose four the horizontal through holes 213 of the discharge shielding 21.

The support member 22 is held by the glass stem 12 through the lead pin 13 inserted in the vertical through hole 220 and the lead pin 14 accommodated in the concave grooves 221 to 223. The rectangular flat plate-like anode plate 24 is welded and fixed to the distal end of the lead pin 14 and pushed onto the rear surface side of the discharge shielding member 21 by the four projections 225 of the support member 22. A heat dissipation space is ensured at the back of the anode plate 24 by providing the depression 224 having an opening substantially matching the surface area of the anode plate 24.

Figure 5:
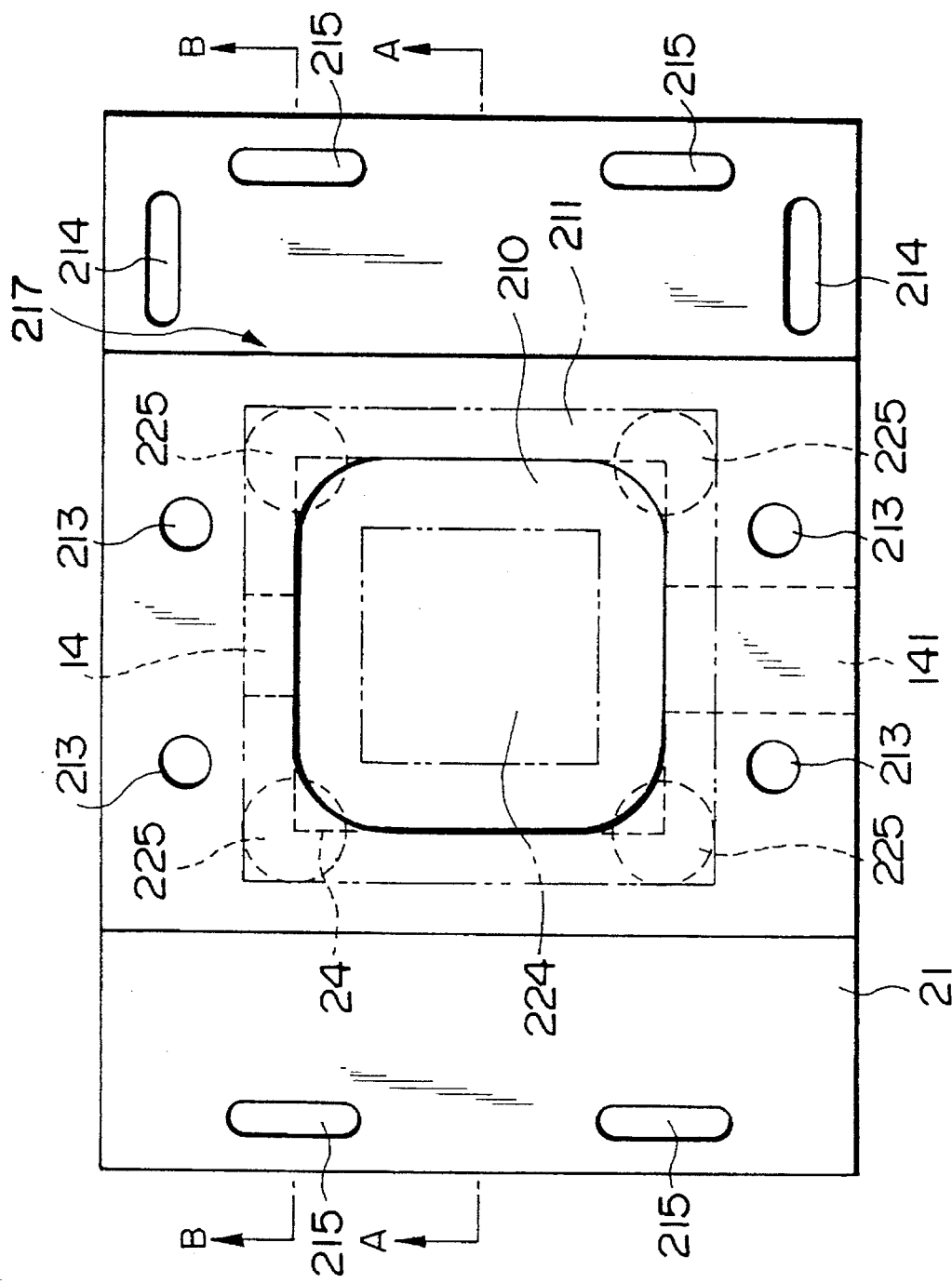
FIG. 5 is a plan view showing a positional relationship among the discharge shielding member, the anode plate, and the support member in the light-emitting portion in FIG. 2.
Figure 7:
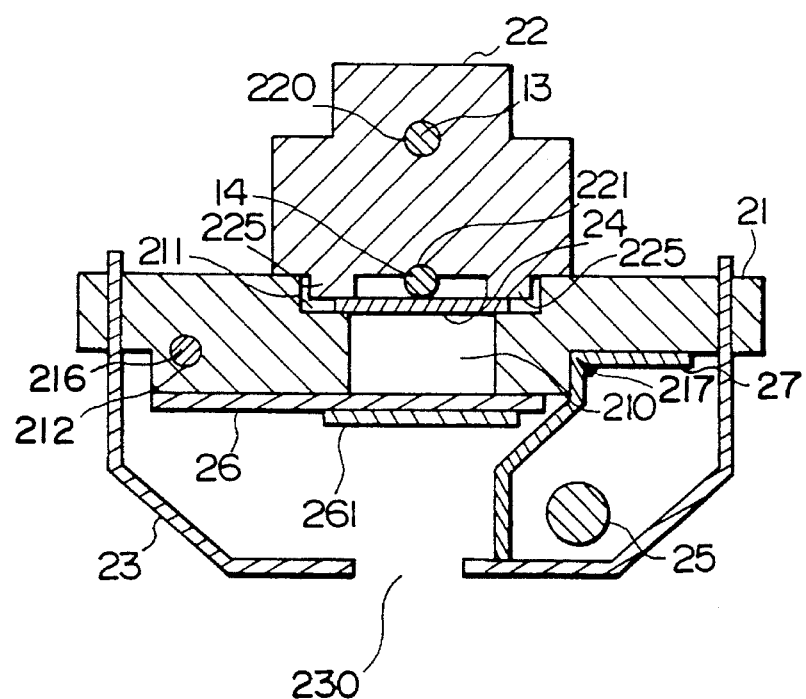
FIG. 7 is a sectional view taken along a line B—B in FIG. 5.
Figure 8:
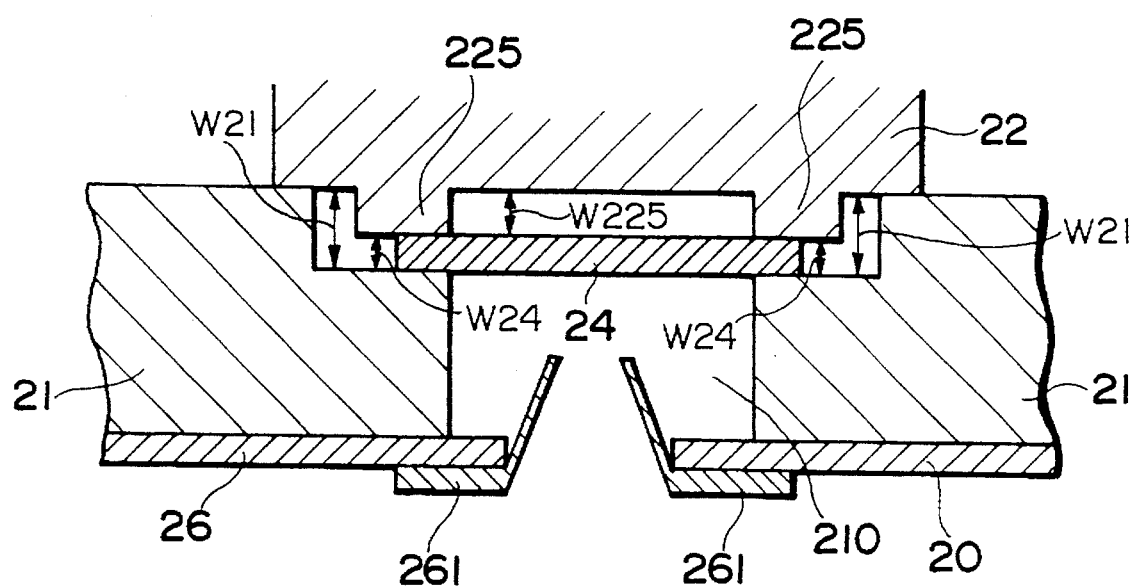
FIG. 8 is a sectional view for explaining a structure of the recessed portion of the discharge shielding member in FIG. 3.

As shown in FIGS. 5, 7, and 8, the rectangular anode plate 24 indicated by a broken line is accommodated in the recessed portion 211 of the discharge shielding member 21. The corner portions of the anode plate 24 are sandwiched by cooperation of the bottom surface 11A of the depression 211 of the discharge shielding member 21 and the four projections 225 of the support member 22. The four sides of the anode plate 24 almost match the slightly round through hole 210 having a substantially rectangular shape. The remaining portion of the opening edge portion of the through hole 210 is joined to the four corner portions of the anode plate 24. The four projections 225 each having a circular surface are joined to the four corner portions of the anode plate 24, thereby pressing the anode plate 24. In particular, as shown in FIG. 8, the rectangular recessed portion 211 has a depth W21 matching the sum of the height w225 of the four projection 225 and the thickness W24 of the anode plate 24. As a result, the peripheral portion formed on the front surface 22B of the support member 22 will be brought into contact with the rear surface 21B of the discharge shielding member 21.

On the other hand, as shown in FIGS. 3 and 4, the parts C1 of the rear surface 21B of the discharge shielding member 21 are brought into contact with the parts C2 of the anode plate 24, and the parts C3 of the top surface of each projection 225 are brought into contact with the parts C4 of the anode plate 24. Thereby, the anode plate 24 is gripped by the projections 225 and the rear surface 21B of the discharge shielding member 21. The top surface of each projection 225 is defined by the part C3 contacting the associated part C4 of the anode plate 24 and other part facing the rear surface 21B of the discharge shielding member 21 without through the anode plate 24. That is, this structure increase the heat radiation efficiency of the anode plate 24 because a specific area of the anode plate 24 decreases, the area being directly contact with insulator (the discharge shielding member 21, the support member 22, etc.) having a lower heat conductivity decreases.

Figure 6:
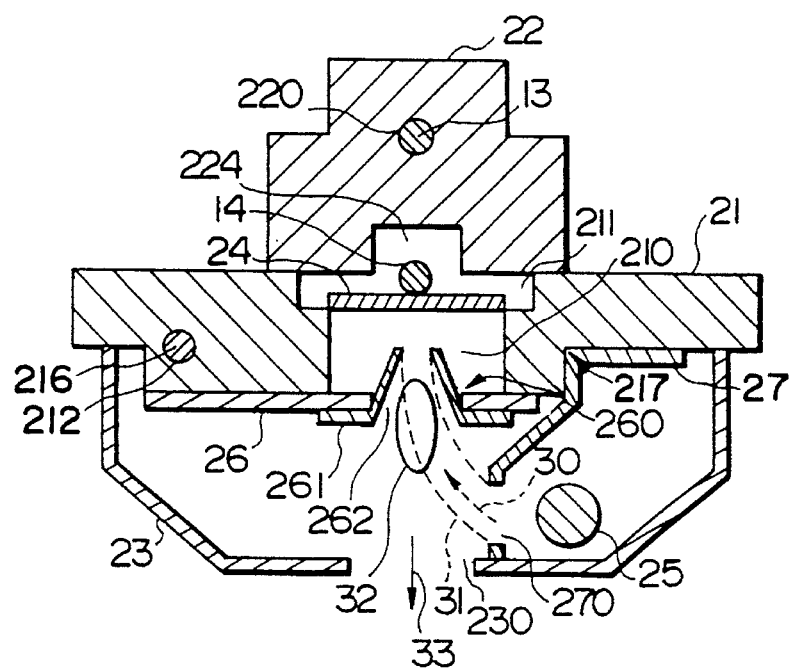
FIG. 6 is a sectional view taken along a line A—A in FIG. 5.

As shown in FIGS. 2 and 6, a focusing electrode 26 constituted by bending a metal plate into a substantially L-shape and an opening limit plate 261, and has an opening 260 and four horizontal through holes 263. The focusing opening 260 is arranged coaxial with the through hole 210 of the discharge shielding plate 21. An opening limit plate 261 for limiting the diameter of the opening is welded to the peripheral region of the opening 260. The opening limit plate 261 has a focusing opening 262 bent toward the anode plate 24 to pass through the opening 260. The four horizontal through holes 263 extend in the direction of thickness of the focusing electrode 26 and oppose the four horizontal through holes of the discharge shielding member 21.

The focusing electrode 26 is arranged so as to be in contact with the front surface 21A of the discharge shielding member 21. Since a distal end portion 26A bent backward is welded to the distal end of the lead pin 13 projecting from the support member 22, the focusing electrode 26 is fixed to the discharge shielding member 21 and the support member 22. Note that the distance between the opening limit plate 261 and the anode plate 24 is smaller than the thickness of the discharge shielding member 21. The horizontal through holes 226 of the support member 22, the horizontal through holes 213 of the discharge shielding member 21, and the horizontal through holes 263 of the focusing electrode 26 are aligned in line. Therefore, when the discharge shielding member 21, the support member 22, and the focusing electrode 26 are bonded each other, and four metal rivets 28 are inserted into the through holes, all these components will be integrally fixed to the stem 12.

As shown in FIGS. 2, 6, and 7, the cathode slit electrode 27 is bent at three portions in correspondence with the shape of the stepped portion 217 of the discharge shielding member 21 and has an opening (slit 270) and two lock pawls 271. With respect to the bottom surface 11A of the envelope 11, the opening 270 having a vertically elongated rectangular shape extends through the cathode slit electrode 27. The two lock pawls 271 formed at the upper and lower ends of the cathode slit electrode 27 are bent backward.

The cathode slit electrode 27 opposes the hot cathode 25 and is positioned in front surface side of the discharge shielding member 21 on its one side. When the two lock pawls 271 are inserted into the two horizontal through holes 214 of the discharge shielding member 21, the cathode slit electrode 27 is engaged with the discharge shielding member 21. Note that the slit 270 is arranged between the hot cathode 25 and the opening limit plate 261.

The metal front electrode 23 is bent at four portions to have a substantially U-shaped section and has an opening window 230 and four lock pawls 231. The rectangular opening window 230 is arranged coaxial with the focusing opening 262 of the focusing electrode 26. The four lock pawls 231 formed at the corners of the front electrode 23 project backward. Note that the opening window 230 is arranged at a position to project ultraviolet light from the space in front of or near the focusing opening 262.

The front electrode 23 is arranged at the front surface 21A of the discharge shielding member 21 on its both sides. When the four lock pawls 231 are inserted into the four horizontal through holes 215 of the discharge shielding member 21, the front electrode 23 is engaging with the discharge shielding member 21. The front end of the cathode slit electrode 27 is brought into contact with the inner wall of the front electrode 23, thereby separating a space where the hot cathode 25 is arranged from a light-emitting space where arc discharge occurs.

The operation of this embodiment will be described below.

When a power of about 10 W is supplied from the external power supply for about 20 seconds before discharge, a predetermined rated voltage is applied to the hot cathode 25, and the hot cathode 25 is preheated. After the hot cathode 25 is sufficiently heated, a DC open voltage of about 150 V is applied between the hot cathode 25 and the anode plate 24.

Upon completion of preparation for arc discharge, a trigger voltage of 350 to 500 V is applied between the hot cathode 25 and the anode plate 24, thereby starting arc discharge among the hot cathode 25, the focusing electrode 26, and the anode plate 24. At this time, the path of thermoelectrons moving in a direction indicated by an arrow 30 is limited to only a discharge path 31 because of the convergent effect of the opening limit plate 261 of the focusing electrode 26 and the shielding effect of the cathode slit electrode 27 and the front electrode 23. More specifically, the thermoelectrons emitted from the hot cathode 25 pass through the focusing opening 262 of the opening limit plate 261 from the slit 270 of the cathode slit electrode 27 and through the through hole 210 of the discharge shielding member 21 and are received by the anode plate 24.

An arc ball 32 as a high-density discharge area by arc discharge is generated in a space in front of or near the opening limit plate 261 on the opposite side to the anode plate 24 through the discharge shielding member 21. Ultraviolet light (U.V) extracted from the arc ball 32 as positive column light emission is emitted toward the front of the anode plate 24, i.e., in a direction indicated by an arrow 33 and is projected through the opening window 230 of the front electrode 23.

The anode plate 24 and the focusing electrode 26 are arranged so as to be in contact with the two opening edge portions of the through hole 210 through the discharge shielding member 21. For this reason, the insulated state between the two electrodes 24 and 26 is maintained by the insulating properties of the material of the discharge shielding member 21. Upon occurrence of arc discharge, the anode plate 24 receives thermoelectrons to generate heat, and the focusing electrode 26 also generates heat upon bombardment of cations.

However, the through hole 210 of the discharge shielding member 21 hardly covers the front surface 24A of the anode plate 24, and the front surface 24A of the anode plate 24 is exposed at maximum. The projections 225 of the support plate 22 are hardly in contact with the rear surface 24B of the anode plate 24, and the rear surface 24B of the anode plate 24 is exposed at maximum. The recessed portion 224 of the support member 22 enlarges the back space of the anode plate 24. For this reason, heat dissipation from the anode plate 24 and the focusing electrode 26 is promoted. Although the material constituting the discharge shielding member 21 and the support member 22 and having electrical insulating properties generally has a low thermal conductivity, the temperature in the space near the anode plate 24 and the focusing electrode 26 can be maintained relatively low.

As a result, for the anode plate 24 and the focusing electrode 26 of the present invention, deformation of the material due to a residual stress in a high temperature state, or a loss of the material due to an evaporation or sputtering phenomenon can be minimized. More specifically, a variation in distance between the two electrodes or energization hardly makes the arc discharge state unstable. Additionally, a loss of the material of the two electrodes hardly makes it difficult to generate arc discharge. Therefore, for long-time continuous light emission, the positions of the anode plate 24 and the focusing electrode 26 are precisely held, thereby realizing a continuously stable operation for a long time.

Next, the arrangement and function of a gas discharge tube according to the second embodiment of the present invention will be described below in detail with reference to FIGS. 9 to 13. Note that a discharge tube of this embodiment is a head-on type deuterium discharge tube which extracts light (U.V) from the head portion of the tube.

Figure 9:
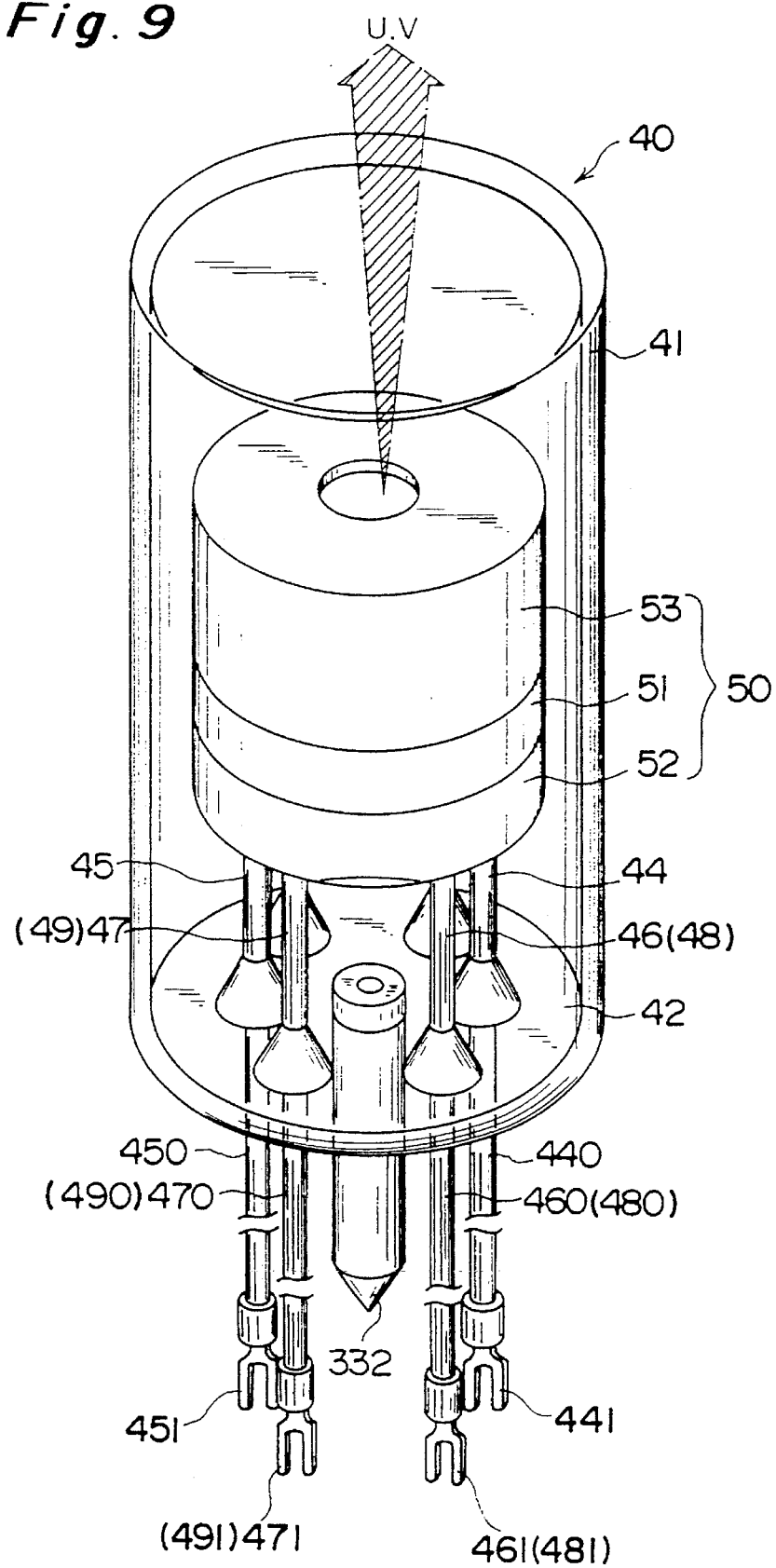
FIG. 9 is a perspective view showing a gas discharge tube according to the second embodiment of the present invention.

As shown in FIG. 9, in a gas discharge tube 40, a light-emitting section 50 is accommodated in a glass envelope 41. Deuterium gas in the glass envelope 11 is sealed in the envelope 41 at about several Torr. The envelope 41 with its head portion sealed has a cylindrical shape, and the bottom portion of the envelope 41 is hermetically sealed by a glass stem 42. The envelop 41 is formed of ultraviolet light transmitting glass or quartz glass having a high permeability to ultraviolet light.

Six lead pins 44 to 49 (in FIG.9, the lead pins 48 and 49 are respectively hidden by the lead pins 46 and 47) substantially circumferentially arranged at an equal angular interval extend from the bottom portion of the light-emitting section 50 through the glass stem 42. The lead pins 44 to 49 are covered by insulating members 440, 450, 460, 470, 480, and 490, respectively (in FIG. 9, the insulator members 480 and 490 are also hidden by the insulator members 460 and 470). Terminals 441, 451, 461, 471, 481, and 491 will be connected to terminals of an external power supply. A tip tube 332 for exhausting/sealing a gas from/in the envelope 41 is mounted on stem 42, externally extends, and is hermetically sealed. The light-emitting section 50 has a shielding box structure in which a ceramic support member 52 and a metal front electrode 53 are bonded each other through a ceramic discharge shielding member (spacer) 51.

The structure of the light-emitting section 50 will be described below in detail with reference to FIGS. 10 to 13.

Figure 10:
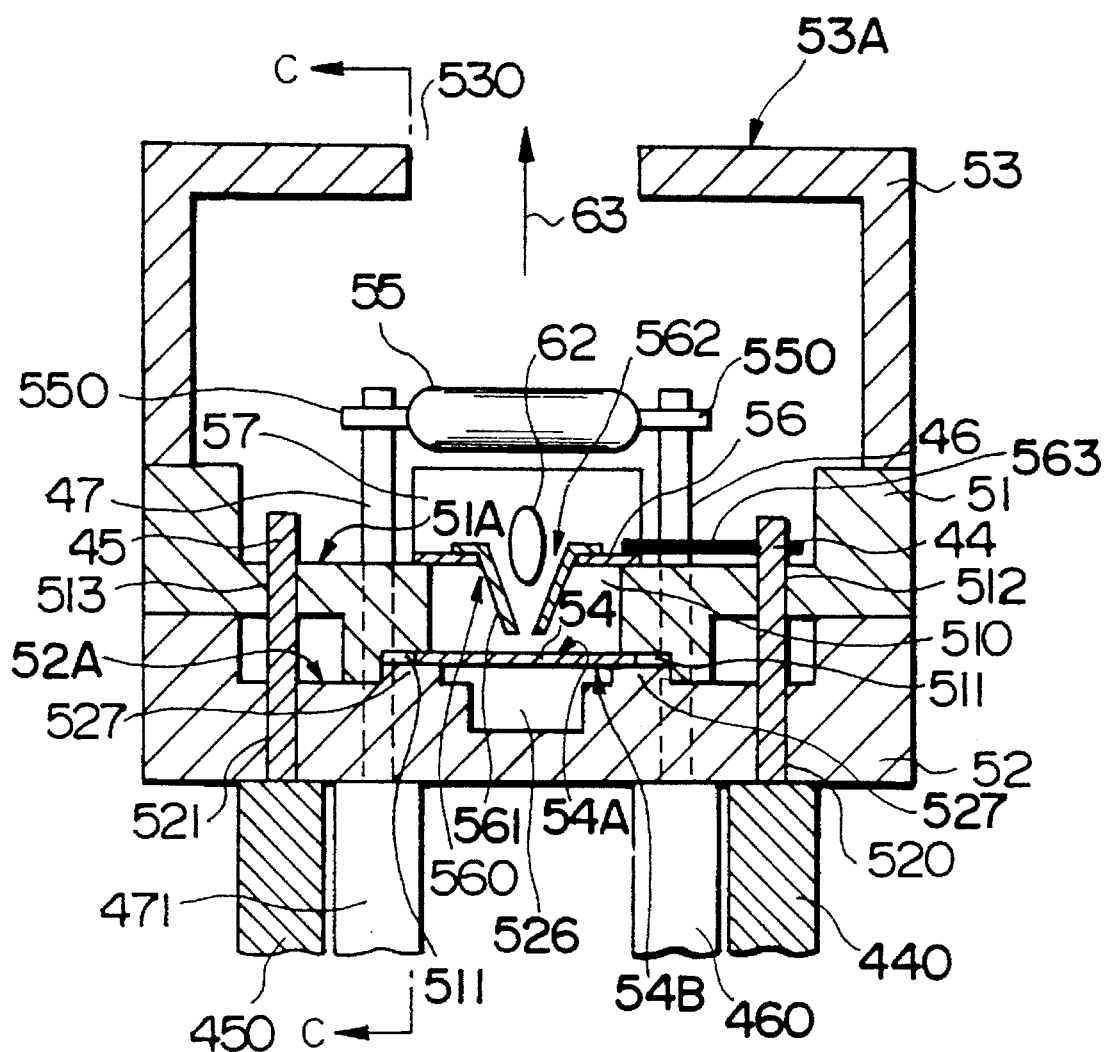
FIG. 10 is a sectional view of a light-emitting portion in the gas discharge tube in FIG. 9.
Figure 11:
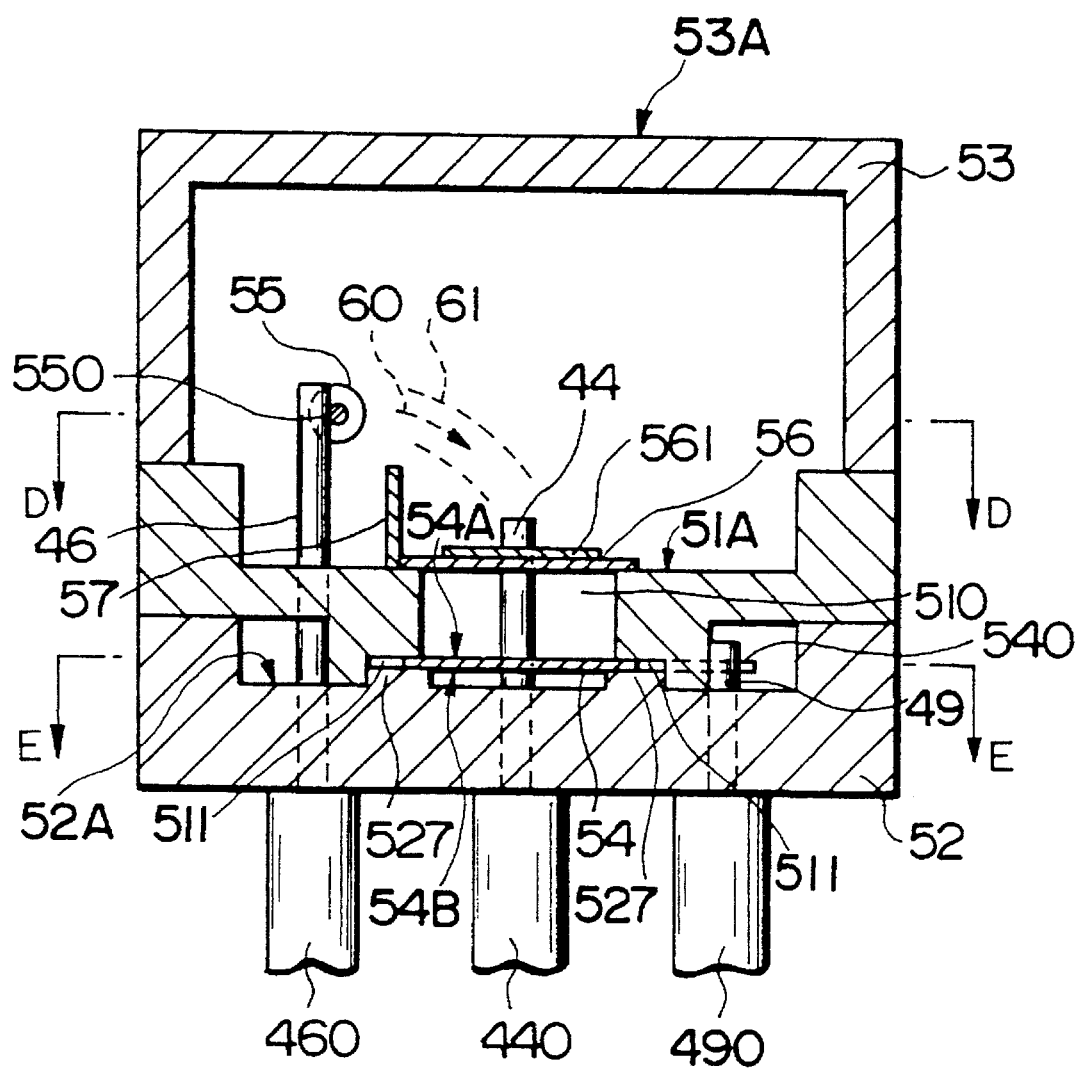
FIG. 11 is a sectional view taken along a line C—C in FIG. 10.
Figure 12:
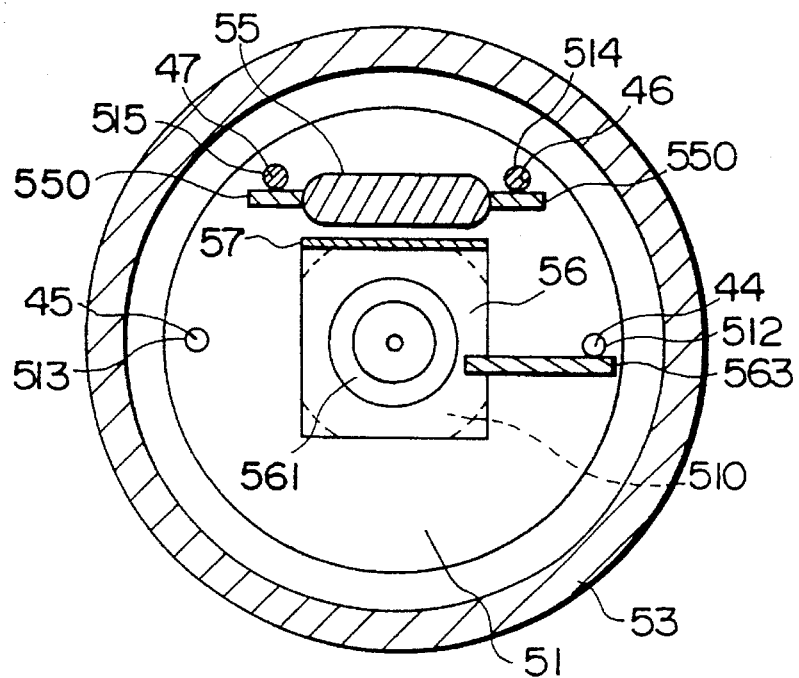
FIG. 12 is a sectional view taken along a line D—D in FIG. 11.
Figure 13:
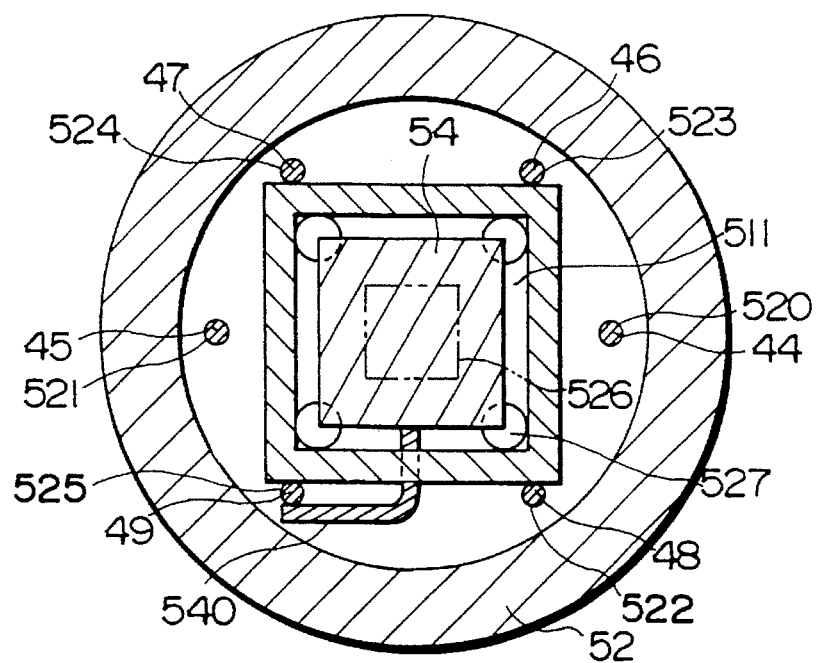
FIG. 13 is a sectional view taken along a line E—E in FIG. 11.

As shown in FIGS. 10, 11, and 13, the support member 52 having a cylindrical shape open upward has six vertical through holes 520 to 525, a depression 526, and four protrusions (projections 527). The six vertical through holes 520 to 525 extend through the support member 52 in substantially the vertical direction with respect to the main surface of the glass stem 42. The recessed portion 526 is recessed on the front surface 52A (the discharge shielding side) of the support member 52. The four projections 527 project from the surface 52A close to the opening edge portion of the depression 526.

The support member 52 is held by the stem 42 through the lead pins 44 to 49 inserted in the vertical through holes 520 to 525 extending through the peripheral region of the four projections 527 in the vertical direction with respect to the main surface of the glass stem 42. A rectangular flat plate-like anode plate 54 is arranged to be pressed by the four projections 527 and connected to one end of a substantially L-shaped electrode rod 540 which is welded to the distal end of the lead pin 49. Note that the depression 526 has an opening substantially matching the surface area of the anode plate 54 so that the heat dissipation space can be extended.

As shown in FIGS. 10 to 13, the discharge shielding member 51 having almost the same outer diameter as that of the support member 52 has a through hole 510, a recessed portion 511, and four vertical through holes 513 to 516. The through hole 510 extends through the discharge shielding member 51 in the substantial vertical direction with respect to the main surface of the glass stem 42. The recessed portion 511 is recessed substantially at the center of the rear surface (the support member side) of the discharge shielding member 51 and includes the opening edge portion of the through hole 510. The four vertical through holes 513 to 516 extend through the discharge shielding member 51 in substantially the vertical direction with respect to the main surface of the glass stem 42. The discharge shielding member 51 is held by the support member 52 through the lead pins 44 to 47 inserted in the vertical through holes 513 to 516 extending through the peripheral region of the recessed portion 511 in the vertical direction.

The anode plate 54 having a rectangular surface is accommodated in the recessed portion 511 of the discharge shielding member 51. The corner portions of the anode plate 54 are sandwiched by cooperation of the bottom surface of the recessed portion 511 of the discharge shielding member 51 and the four projections 527 of the support member 52. The four sides of the anode plate 54 almost match the slightly round through hole 510 having a substantially rectangular shape. The remaining portion of the opening edge portion of the through hole 510 is joined to the four corner portions of the anode plate 54. The four projections 527 each having a circular surface are joined to the four corner portions of the anode plate 54, thereby pushing the anode plate 54. The rectangular recessed portion 511 has a depth matching the sum of the height of the four projections 517 and the thickness of the anode plate 54. As a result, the outer peripheral portion in the front surface 52A of the support member 52 will be brought into contact with the rear surface of the discharge shielding member 51. This gripping structure is substantially equal to that of the first embodiment shown in FIG. 8, and the same heat radiation effect can be obtained.

A metal focusing electrode 56 having a rectangular flat plate-like shape has an opening 560. The opening 560 is arranged coaxial with the through hole 510 of the discharge shielding member 51. An opening limit plate 561 for limiting the diameter of the opening 560 is welded to the peripheral region of the opening 560. A focusing opening 562 bent toward the anode plate 54 to pass through the opening 560 is formed in the opening limit plate 561.

The focusing electrode 56 is on the front surface 51A of the discharge shielding member 51 at its center and connected to one end of a linear electrode rod 563 welded to the distal end of the lead pin 44. Note that the distance between the opening limit plate 561 and the anode plate 54 is smaller than the thickness of the discharge shielding member 51.

When the two ends of an electrode rod 550 welded to a spiral hot cathode (filament) 55 are welded to the distal ends of the lead pins 46 and 47, the hot cathode 55 will be held by the stem 42. A rectangular flat plate-like discharge straightening plate 57 is interposed between the hot cathode 55 and the opening limit plate 561 and welded to the end portion of the focusing electrode 56. Note that the hot cathode 55 is located on the opposite side to the opening limit plate 561 through the discharge straightening plate 57 and arranged above the discharge straightening plate 57.

The metal front electrode 53 has almost the same outer diameter as that of the discharge shielding member 51 and a cylindrical shape open downward. An opening window 530 is formed at a top surface 53A of the front electrode 53. The circular opening window 530 is arranged coaxial with the focusing opening 562 of the focusing electrode 56 and extends through at the central portion. Note that the opening window 530 is arranged at a position to project ultraviolet light (U.V) from a space in front of the focusing opening 562. The front electrode 53 is arranged and fixed on the outer circumference of the discharge shielding member 51.

The operation of this embodiment will be described below.

When a power of about 10 W is supplied from the external power supply in 20 seconds before discharge, a predetermined rated voltage is applied to the hot cathode 55, and the hot cathode 55 is preheated. After the hot cathode 55 is sufficiently heated, a DC open voltage of about 150 V is applied between the hot cathode 55 and the anode plate 54.

Upon completion of preparation for arc discharge, a trigger voltage of 350 to 500 V is applied between the hot cathode 55 and the anode plate 54, thereby starting arc discharge among the hot cathode 55, the focusing electrode 56, and the anode plate 54. At this time, the path of thermoelectrons moving in a direction indicated by an arrow 60 is limited to only a discharge path 61 because of the convergent effect of the opening limit plate 561 of the focusing electrode 56 and the shielding effect of the discharge straightening plate 57 and the front electrode 53. More specifically, the thermoelectrons emitted from the hot cathode 55 pass through the focusing opening 562 of the opening limit plate 561 from the upper portion of the discharge straightening plate 57 and through the through hole 510 of the discharge shielding member 51 and are received by the anode plate 54.

An arc ball 62 as a high-density discharge area by arc discharge is generated in a space above the opening limit plate 561 on the opposite side to the anode plate 54. Ultraviolet light extracted from the arc ball 62 as positive column light emission is emitted in a direction indicated by an arrow 63 and is projected through the opening window 530.

The anode plate 54 and the focusing electrode 56 are arranged so as to be in contact with the two opening edge portions of the horizontal through hole 510 through the discharge shielding member 51. For this reason, the insulated state between the two electrodes is maintained by the insulating properties of the material of the discharge shielding plate 51. Upon occurrence of arc discharge, the anode plate 54 receives the thermoelectrons to generate heat, and the focusing electrode 56 also generates heat upon bombardment of cations.

However, the through hole 510 of the discharge shielding member 51 hardly covers the front surface 54A of the anode plate 54, and the front surface 54A of the anode plate 54 is exposed at maximum. The projections 527 of the support member 52 are hardly in contact with the anode plate 54, and the rear surface 54B of the anode plate 54 is exposed at maximum. The depression 526 of the support member 52 enlarges the back space of the anode plate 54. For this reason, heat dissipation from the anode plate 54 and the focusing electrode 56 is promoted. Although the material constituting the discharge shielding member 51 and the support member 52 and having electrical insulating properties generally has a low thermal conductivity, the temperature in the space near the anode plate 54 and the focusing electrode 56 can be maintained relatively low.

As a result, for the anode plate 54 and the focusing electrode 56 of the present invention, deformation of the material due to a residual stress in a high temperature state, or a loss of the material due to an evaporation or sputtering phenomenon can be minimized. More specifically, a variation in distance between the two electrodes or energization hardly makes the arc discharge state unstable. Additionally, a loss of the material of the two electrodes hardly makes it difficult to generate arc discharge. Therefore, for long-time continuous light emission, the positions of the anode plate 54 and the focusing electrode 56 are precisely held, thereby realizing a continuously stable operation for a long time.

The gas discharge tube of the present invention is not limited to the above embodiments, and various changes and modifications can also be made.

In the above embodiments, as the material of the discharge shielding member 21 and the support member 22, a normal ceramic is used. However, a so-called conductive ceramic such as beryllium oxide or aluminum nitride having a high thermal conductivity can also be used. In this case, the discharge shielding member 21 and the support member 22 serve as a heat sink for the anode plate 24 which is heated to a high temperature due to self heat generation and promote dissipation of the heat accumulated in the light-emitting section 20. Therefore, the operational stability of the gas discharge tube can be further improved.

As has been described above in detail, in the gas discharge tube of the present invention, at least two portions of the opening edge portion of the through hole of the discharge shielding member are joined to the periphery of the anode plate. The remaining portion of the opening edge portion is matched with the periphery of the anode plate. With this arrangement, the anode plate and the focusing electrode are arranged so as to be in contact with the front and rear surfaces of the discharge shielding member. In this case, the front surface of the anode plate can be exposed at maximum through the through hole of the discharge shielding member, heat dissipation from the anode plate and the focusing electrode will be promoted, and the temperature in the space near the anode plate and the focusing electrode will be kept extremely low as compared to the prior art.

As a result, for the anode plate and the focusing electrode, deformation of the material due to a residual stress in a high temperature state, or a loss of the material due to an evaporation or sputtering phenomenon will be minimized. More specifically, a variation in distance between the two electrodes or energization hardly makes the arc discharge state unstable. Additionally, a loss of the material of the two electrodes hardly makes it difficult to generate arc discharge. Therefore, for long-time continuous light emission, the positions of the anode plate and the focusing electrode are precisely held, thereby realizing a continuously stable operation for a long time.

Note that, when the anode plate is sandwiched between the discharge shielding member and the support member, the plurality of projections of the support member are used to expose the rear surface of the anode plate at maximum. In addition, when the recessed portion is formed in the support member, the heat dissipation space for the anode plate can be ensured. For this reason, heat dissipation from the anode plate and the focusing electrode can be promoted.

Therefore, a gas discharge tube having a long service life and capable of improving the operational stability during long-time continuous light emission can be provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims. The basic Japanese Application No. 6-207712 (207712/1994) filed on Aug. 31, 1994 is hereby incorporated by reference.

What is claimed is:

1. A gas discharge tube comprising:

an envelope for sealing a gas therein;

a discharge shielding member of an insulator being in said envelope, said discharge shielding member having a front surface and a rear surface which is opposite to said front surface and which is communicated with the front surface by a through hole;

a hot cathode for emitting thermoelectrons, being in said envelope and located at the front surface side of said discharge shielding member;

an anode plate for receiving the thermoelectrons emitted from said hot cathode, being in contact with at least two parts of the rear surface of said discharge shielding member and covering an opening of the through hole at the rear surface side of said discharge shielding member;

a focusing electrode being supported by said discharge shielding member and in contact with the front surface of said discharge shielding member, said focusing electrode having a focusing opening which is located at a position of an opening of the through hole at the front surface side of said discharge shielding member, for converging paths of the thermoelectrons; and a support member of an insulator being in said envelope and located on an opposite side to said discharge shielding member through said anode plate, said support member having at least two projections for respectively pushing said anode plate onto said parts of the rear surface of said discharge shielding member, whereby at least two parts of said anode plate are gripped by said projections of said support member and the rear surface of said discharge shielding member.

2. A gas discharge tube according to claim 1, wherein said support member further has a depression at it's surface which faces to said anode plate, for providing a heat dissipation space for said anode plate, said depression extending from the surface of said support member to a vertical direction with respect to the rear surface of said discharge shielding member.

3. A gas discharge tube according to claim 1, wherein each of said projections of said support member has a top surface being in parallel with respect to the rear surface of said discharge shielding member, a part of said top surface of each projection facing the rear surface of said discharge member without through said anode plate.

4. A gas discharge tube according to claim 1, wherein said discharge shielding member and said support member are formed of a ceramic.

5. A gas discharge tube according to claim 1, wherein said discharge shielding member has a recessed portion at the rear surface of said discharge shielding member, for accommodating said anode plate.

6. A gas discharge tube according to claim 1, wherein said discharge shielding member is disposed in the inner space of said envelope while being supported by lead pins penetrating said envelope.

7. A gas discharge tube according to claim 6, wherein said discharge shielding member is spaced from an inner side wall of said envelope through a space containing the gas.

8. A gas discharge tube according to claim 6, wherein the recessed portion of said discharge shielding member has a depth matching a sum of a height of said projection of said support member and a thickness of said anode plate, whereby a front surface of said support member is in partially contact with the rear surface of said discharge shielding member.

9. A gas discharge tube according to claim 1, wherein said anode plate is supported by a distal end of a lead pin penetrating said envelope.

10. A gas discharge tube according to claim 1, further comprising a cathode slit electrode for discharge shielding, positioned and mounted on the front surface of said discharge shielding member, said cathode slit electrode having a slit for passing through thermoelectrons emitted from said hot cathode.

11. A gas discharge tube according to claim 1, further comprising a front electrode for discharge shielding, positioned and mounted on the front surface of said discharge shielding member so as to accommodate said hot cathode and said cathode slit electrode in a space defined by said front electrode and said focusing electrode, said front electrode having a window located at a position which faces to the focusing opening of said focusing electrode, for outputting light caused by discharge.

12. A gas discharge tube comprising:

an envelope for sealing a gas therein;

lead pins introduced into an inner space of said envelope from external of said envelope; and a light-emitting section positioned at distal ends of said lead pins and supported by said lead pins while spaced from an inner side wall of said envelope, said light-emitting section including:

a discharge shielding member of an insulator being in said envelope, said discharge shielding member having a front surface and a rear surface which is opposite to said front surface and which is communicated with the front surface by a through hole;

a hot cathode for emitting thermoelectrons, being in said envelope and located at the front surface side of said discharge shielding member;

an anode plate for receiving the thermoelectrons emitted from said hot cathode, being in contact with at least two parts of the rear surface of said discharge shielding member and covering an opening of the through hole at the rear surface side of said discharge shielding member;

a focusing electrode being supported by said discharge shielding member and in contact with the front surface of said discharge shielding member, said focusing electrode having a focusing opening which is located at a position of an opening of the through hole at the front surface side of said discharge shielding member, for converging paths of the thermoelectrons; and a support member of an insulator being in said envelope and located on an opposite side to said discharge shielding member through said anode plate, said support member having at least two projections for respectively pushing said anode plate onto said parts of the rear surface of said discharge shielding member, whereby at least two parts of said anode plate are gripped by said projections of said support member and the rear surface of said discharge shielding member.

13. A gas discharge tube according to claim 12, wherein said support member further has a depression at it's surface which faces to said anode plate, for providing a heat dissipation space for said anode plate, said depression extending from the surface of said support member to a vertical direction with respect to the rear surface of said discharge shielding member.

14. A gas discharge tube according to claim 12, wherein each of said projections of said support member has a top surface being in parallel with respect to the rear surface of said discharge shielding member, a part of said top surface of each projection facing the rear surface of said discharge member without through said anode plate.

15. A gas discharge tube according to claim 12, wherein said discharge shielding member and said support member are formed of a ceramic.

16. A gas discharge tube according to claim 12, wherein said discharge shielding member has a recessed portion at the rear surface of said discharge shielding member, for accommodating said anode plate.

17. A gas discharge tube according to claim 12, wherein said discharge shielding member is disposed in the inner space of said envelope while being supported by lead pins penetrating said envelope.

18. A gas discharge tube according to claim 17, wherein said discharge shielding member is spaced from an inner side wall of said envelope through a space containing the gas.

19. A gas discharge tube according to claim 17, wherein the recessed portion of said discharge shielding member has a depth matching a sum of a height of said projection of said support member and a thickness of said anode plate, whereby a front surface of said support member is in partially contact with the rear surface of said discharge shielding member.

20. A gas discharge tube according to claim 12, wherein said anode is supported by a distal end of a lead pin penetrating said envelope.

21. A gas discharge tube according to claim 12, further comprising a cathode slit electrode for discharge shielding, positioned and mounted on the front surface of said discharge shielding member, said cathode slit electrode having a slit for passing through thermoelectrons emitted from said hot cathode.

22. A gas discharge tube according to claim 12, further comprising a front electrode for discharge shielding, positioned and mounted on the front surface of said discharge shielding member so as to accommodate said hot cathode and said cathode slit electrode in a space defined by said front electrode and said focusing electrode, said front electrode having a window located at a position which faces to the focusing opening of said focusing electrode, for outputting light caused by discharge.

* * * * *